US006542466B1

United States Patent
Pashtan et al.

(10) Patent No.: US 6,542,466 B1
(45) Date of Patent: Apr. 1, 2003

(54) COMMUNICATION NETWORK METHOD AND APPARATUS

(75) Inventors: Ariel Pashtan, Buffalo Grove, IL (US); Raymond M. Liss, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/315,314

(22) Filed: May 20, 1999

(51) Int. Cl.[7] .............................................. H04L 12/26
(52) U.S. Cl. ...................................... 370/235; 370/236
(58) Field of Search ................................ 370/235, 236, 370/237, 238

(56) References Cited

U.S. PATENT DOCUMENTS

| | | | | |
|---|---|---|---|---|
| 6,452,915 B1 | * | 9/2002 | Jorgensen ................... | 370/338 |
| 2002/0041600 A1 | * | 4/2002 | Barri .......................... | 370/413 |
| 2002/0120767 A1 | * | 8/2002 | Oottamakorn et al. ...... | 709/235 |

OTHER PUBLICATIONS

IEEE Internet Computing, "IP QOS: Traveling in First Class on the Internet", Mar.–Apr. 1999, pp. 84–88 by Chris Metz of Cisco Systems.*

Network Working Group Notes "An Architecture for Differentiated Services" dated Dec., 1998, pp. 1–32 by Blake, et al.*

Network Working Group Notes "Definition of the Differentiated Services Field (DS Field) in the Ipv4 and Ipv6 Headers", dated Dec., 1998, pp. 1–18 by Nichols, et al.*

* cited by examiner

Primary Examiner—Melvin Marcelo
(74) Attorney, Agent, or Firm—Sayed Hossein Beladi

(57) ABSTRACT

Network (300) collects performance data associated with each network element, passes the performance data associated with each network element to a network management element (330), creating a global traffic conditioning control, communicates the global traffic conditioning control to at least one of the plurality of network elements, and re-shapes an internal control of at least one of the plurality of network elements based on the global traffic conditioning control. In another aspect, a network (400) detects congestion of a micro communication flow associated with at least one of a plurality of communication traffic flows at a first network element, detects a communication traffic flow priority at a first level associated with the congested micro communication flow, changes at a second network element, in an upstream communication flow in relation with the first network element, the priority from the first level to a second level.

21 Claims, 3 Drawing Sheets

COMMUNICATION NETWORK METHOD AND APPARATUS

FIELD OF THE INVENTION

The present invention relates to communication system networks, particularly, to method and apparatus for controlling quality of communication services in a communication network.

BACKGROUND OF THE INVENTION

In network communication systems, a source user may communicate to a terminal user via a network that includes a number of network elements. Such network elements are normally network traffic router elements and network edge elements. The communication between the users takes place by creating a communication flow among the network elements. The communication flow is then used to transmit data packets. The creation of the communication flow and transmission of the data packets may occur at the same time in some system. Such systems may include Asynchronous Transfer Mode (ATM), Switched Virtual Circuit, and Internet Protocol based network technologies.

A communication network may provide communication traffic flow control based on state information collected and analyzed by each network element in a communication flow. Each network element independently may control the communication traffic based on a pre-defined communication flow profile. Each network element processes the traffic flow that passes through it to control the traffic flow. A commonly known method called Differentiated Services Architecture (DiffServ) is used to control communication traffic flow. A copy of the standard outlining such architecture may be obtained by contacting IETF Secretariat, c/o Corporation for National Initiatives, 1895 Preston White Drive, Suite 100, Reston, Va. 20191-5434, USA; or a copy may be obtained by accessing an internet wed site located at WWW.ietf.Com.

Referring to FIG. 1, a conceptual block diagram of a communication network 100 is shown. The quality of service in such a network is managed by encoding a value in a DS field of data packets originated at an edge network element 110. The internal network elements 120 and 130, when the packet is passing through, assign different Per-Hop behavior to each traffic flow. Such behavior is according to a predefined traffic flow arrangement in the network element. A specific traffic flow profile is selected for each packet depending on the value in the DS filed of the data packet. The value of DS field normally is assigned by an edge network element through, possibly, a negotiation with a source user.

The source users 150 connect to edge network elements 110 for receiving communication services. Such source users may require different services such as voice, data and video services. The terminal users 160 may be the end users of a number of communication traffic flows created for providing the communication services. At the terminal users, there may be other edge network elements such as edge network elements 140. A "U" interface 170 may be a flexible wire-less or wire-line connection interface between the end users and the network elements. A "DS" interface 180 between other network elements is based on a predefined standard such as DiffServ standard. Each network element, such as network elements 120 and 130, passes each data packets in the communication flow according to a communication traffic profile selected based on a DiffServ value assigned in the DS field of the data packet.

Referring to FIG. 2, a block diagram of a network element 210 is shown. A packet classifier 220 selects data packets in the data stream based on the content of some portion of the data packet header such as the DS field. Classifier 220 is used to steer packets of data based on a communication traffic flow profile. Each data packet with a specific marked DS field may pass according to predefined communication traffic flow latency set by the profile. Conditioning communication traffic flow may occur at classifier 220. A traffic meter 230 measures the temporal property of the traffic flow passing through the classifier 220. The meter 230 passes state information to other traffic conditioning functions to trigger a particular action for each packet depending on whether the packet is in or out of a predefined profile. A marker 240 marks a packet of data to a particular DS value such that the packet passes through according to a specific profile. The shaper and dropper 250 delay or discard the data packet to condition the traffic flow according to a predefined traffic profile. Such traffic flow is simple and does not take into account the activities and communication traffic flows at other network elements in the system.

Therefore, there is a need for an effective traffic flow management control that takes into consideration an aggregate traffic flow across the network.

DETAILED DESCRIPTION OF THE PREFERRED EMBODIMENTS

Figure 3:
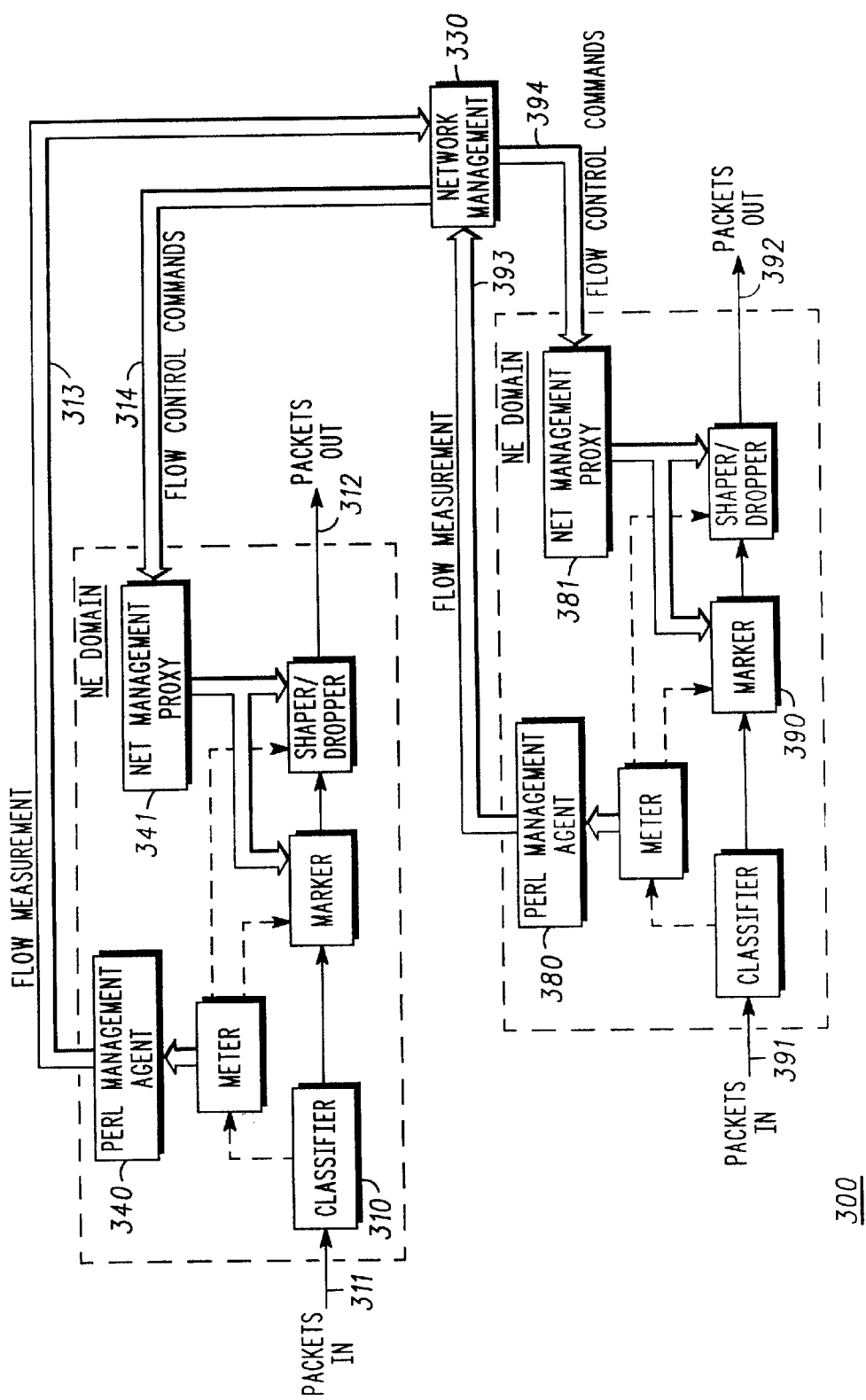
FIG. 3 depicts a block diagram of a communication network according to various embodiments of the invention.

Referring to FIG. 3, a communication network 300 according to various embodiments of the invention is shown. Communication network 300 includes a plurality of network elements, such as network elements 310 and 390. The network elements collectively connect a plurality of source users to a plurality of terminal users. The connections are made by creating a plurality of communication traffic flow through the plurality of network elements. The data packets in the traffic flows ingress at nodes such as nodes 311 and 391, and egress at nodes such as nodes 312 and 392. Each network element may have an internal traffic conditioning control. Such internal control may be performed by interconnection of one or more blocks such as a classifier for classifying an ingress data packets, a meter for measuring performance, a marker for marking the data packets, and a shaper and dropper to shape the data traffic flow according to a profile.

According to an embodiment of the invention, a network management controller 330 collects information from the meter of each network element. The performance collection may be made via a performance management agent, such as performance management agents 340 and 380. Such information includes performance data information associated with each network element. The performance data associated with each network element passes via a connection, such as connections 313 and 393, to network management element 330. The network management element 330 creates a global traffic conditioning control based on the performance data associated with each network element received via connections 313 and 393. The global traffic conditioning control is communicated via connections 314 and 394 to each of the plurality of network elements 310 and 390. The network elements 310 and 390 re-shape their internal control based on the global traffic conditioning control. Each network element may allow a network management proxy, such as proxy 341 and 381, to exist at each network element to influence function of marker, and shaper and dropper in each network element.

The network management element 330 creates a global traffic conditioning control based on the performance data associated with each network element received via connections 313 and 393. The performance data may include number of dropped data packets, delay distribution of data packets, distribution of sizes of packets, and DiffServ values of communication flows. The creation of the global control traffic conditioning may include identifying the network elements that are in a congested state by examining the performance data received from each network element. This may include correlating performance data received from a plurality of network flows and elements that are mainly responsible and associated for providing communication between a pair of source user and terminal user. There is normally more than one pair of source and terminal users.

To minimize excessive global management control, the global traffic conditioning control may be based on a min/max analysis to find the largest congestion relief with minimum adjustments at the network elements. As a result, a network element may be selected for changing its internal control to effect the global traffic conditioning in relieving traffic congestion. The adjusted network element may not be the same network element that has the congested condition. The network element with the congested condition may be requested to send a periodic report to the network management reporting the status of the congested condition. If the congestion condition continues, the network management repeats the analysis to determine another global traffic conditioning control. Other suitable analysis may also be performed.

The source users may be of wireless cellular users with different requirements of services. Such services may include voice, data and video services. As a result, a mobile station acting as a source user may specify a range of quality of services that may need to be provided by the network system. When such service qualities are established at the beginning of a call set-up, the network management 330 may ensure that such quality of call is maintained at all times. The source users communicate with edge elements. The edge elements may not have adequate and real time information about the available quality of service of the system. A source user may require a service quality that initially may be available but it is not guaranteed to continue. Moreover, the condition of the network communication may change at any time. An adequate dedication of network resources in the beginning for assurance of quality of service may shown to be an over dedication of resources when a condition of the network changes after the initial call set-up. The network management 330 has control of every network element in addition to internal control maintained by each network element. The network management 330, thus, makes an efficient utilization of network resources at all times when takes into consideration performance data of each network element for maintaining a global control of the quality of services.

Re-shaping may include changing a DS field of a data packet from a first value to a second value to control quality of service associated with the communication of the packet of data. The first value may have been assigned by the network management 330, or may have been assigned by a source user on its initial call set-up with the network. The second value may be a value selected from a plurality of values that are pre-defined to be acceptable for quality of services associated with communication of the packet of data. The acceptable values may be assigned and be required by the source user on the initial set-up or later in the communication.

Furthermore, the re-shaping may include changing Diff-Serv probability model of at least one of the network elements.

Collecting performance data associated with each network element may include performing a statistical analysis of performance data to create a summarized performance data. The summarized performance data passes in substitute of the performance data. The summary report may be an efficient way of providing a global control when a summary report can be created to indicate with accuracy the performance data of each network element. Furthermore, creating the global traffic conditioning control may include correlating service records across a number of the network elements or traffic flows or both. The global control may be periodic, continuously or on demand by an external monitoring device. Re-shaping may include changing DiffServ values of at least one of the network elements by over-riding its internally controlled DiffServ values.

Figure 4:
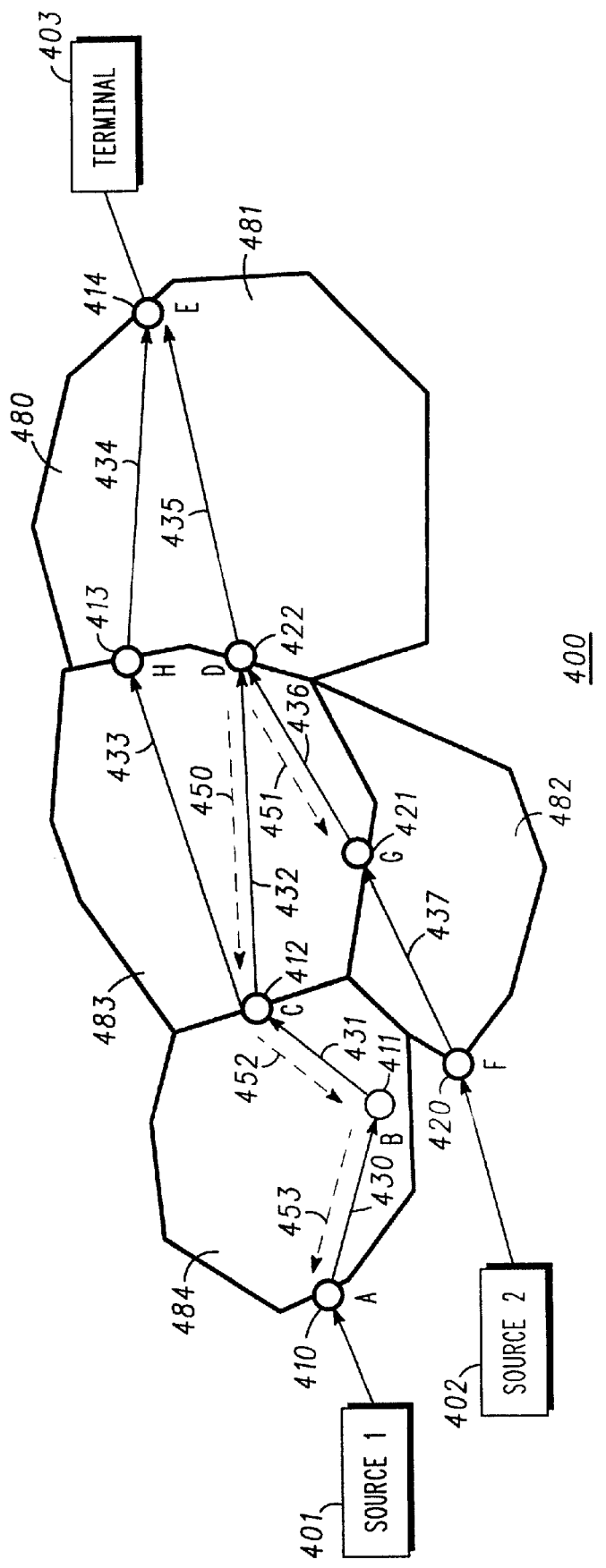
FIG. 4 depicts a block diagram of a communication network according to various embodiments of the invention.

Referring to FIG. 4, a block diagram of communication network 400 shows a conceptual communication flow connections from source users 401 and 402 to a terminal user 403. The communication flow originated from source 401 begins at network element 410 and passes through network elements 411–12, 422 and 414 or 411–14 to reach the terminal user 403. The communication flow may be segmented to micro communication flows such as micro communication flows 430–35. A communication flow from source 402, similarly, passes through network elements 420, 421 and 422 and 414 to reach terminal user 403, which involves micro communication flows 437, 436 and 435. The network element 412 is in an upstream relation with respect to network element 422 for micro communication flow 432, and a network element 421 is in an upstream relation with respect to network element 422 for a micro communication flow 436. The network element 422 is in a downstream relation with respect to network elements 412 and 421 for respectively micro communication flows 432 and 436.

According to one or more aspects of the invention, communication network 400 that provides communication flows between end users may include a plurality of network elements, such as network elements 410–14, and 420–22. The communication flow may be from source users 401 and 402 to terminal user 403. The communication flow may include a plurality of micro communication flows such as micro communication flows 430–37. Each communication micro flow may be between two network elements. A network element, such as network element 422, may detect congestion of a micro communication flow, such as micro communication flows 436 and 432, at its ingress node. The network element 422 may also detect a communication traffic flow priority associated with the congested micro communication flow; that may be either micro communication flow 432 or 436. The detected priority level may be at a first level. A second network element may change the first communication traffic flow priority from the first level to a second level. The second network element may be either network element 412 or 421 depending which micro communication flow, either micro communication flows 432 or 436, was detected to be in a congested condition. The second network element is in an upstream relation in the communication flow with respect to the first network element 422. If micro communication flow 432 was detected to be in a congested condition, the second network element is the network element 412. Network element 422 may communicate to network element 412 via connections 450 in order to inform network element 412 of a request for change of communication traffic flow priority.

The second priority level of the congested micro communication flow may be selected from a range of pre-defined acceptable priority levels. Such acceptable priority levels may be assigned when a communication flow is initially set up at the network. The source of the communication or the types of services required by the source may allow a range of priority levels. Micro communication flows move faster in the network when they carry a high priority level. A communication flow may include a number of communication micro flows each with a different priority level. Priority level of each micro communication flow may be changed or set at a different level by a network element in the stream of the communication flow. The second priority level of the congested micro communication flow may be of a lower or higher priority level than the first level.

In some cases, due to different reasons such as an overriding network element local control, the second upstream network element may not be able to change the priority level of the communication flow, or it may not be able to change to a requested level. In this case, a third network element may change the first communication traffic flow priority from the first level to the second level. The third network element may be in an upstream communication flow in relation with the second network element. Detecting congestion of the micro communication flow may be by way of detecting whether the micro communication flow is out of a predefined communication flow profile.

Figure 1:
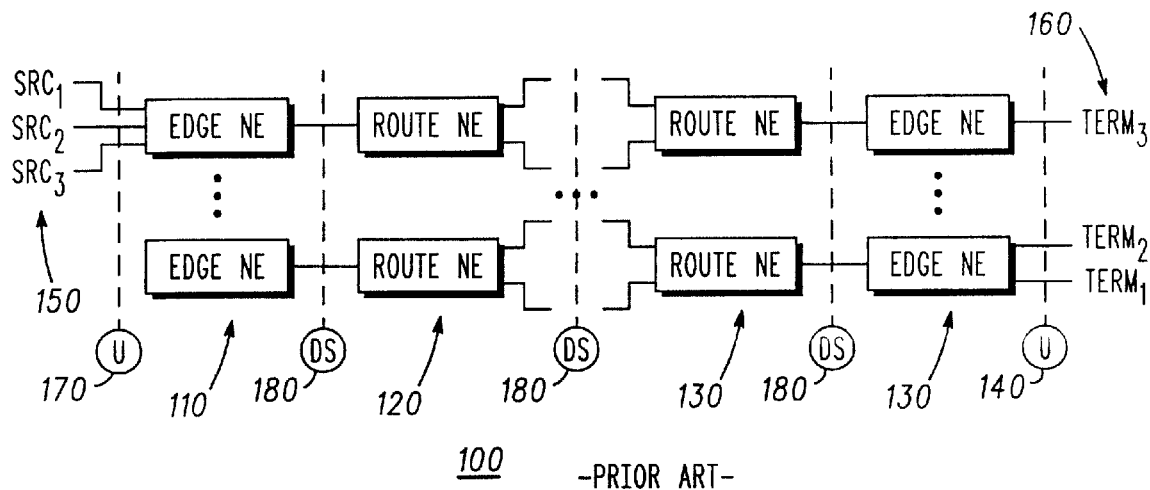
FIG. 1 depicts a conceptual block diagram of a communication network according to prior art.
Figure 2:
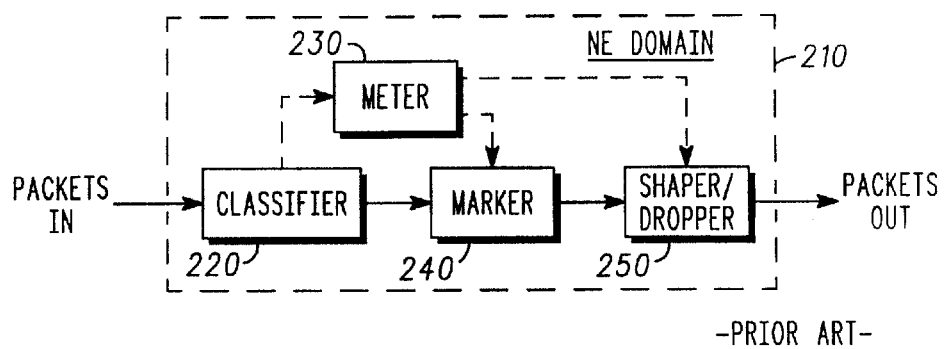
FIG. 2 depicts a block diagram of a network element according to prior art.
Figure 5:
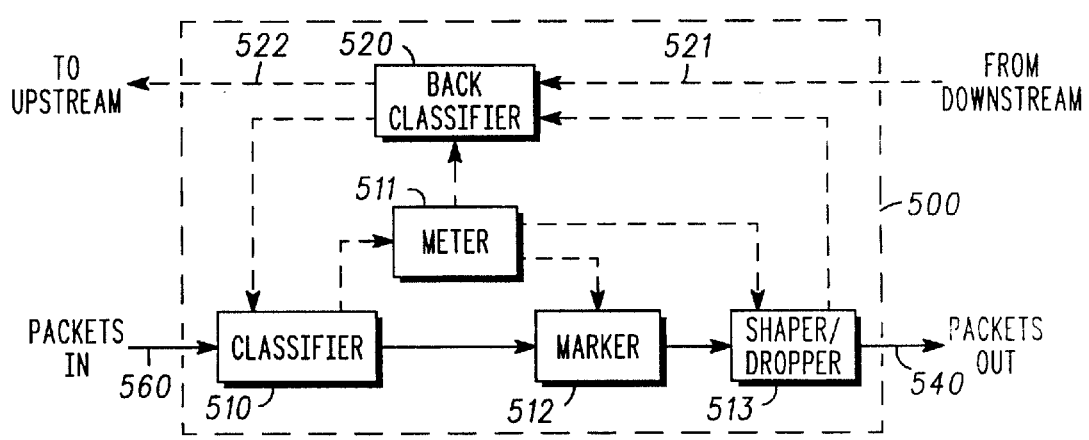
FIG. 5 depicts a block diagram of a network element 500 according to various embodiments of the invention.

Referring to FIG. 5, a block diagram of a network element 500 according to one or more aspects of the invention is shown. Network element 500 may include a classifier 510, a marker 512, a shaper and dropper 513, a meter 511, and a back-classifier 520. Packet of data associated with micro communication flow ingress at input 530. In combination, classifier 510 and meter 511 may determine the condition of the communication flow associated with the network element and the micro communication flow. The marker 512, and shaper and dropper 513 may make adjustment to the priority of the micro communication flow if necessary based on inputs from meter 511. Meter 511 may detects congestion of communication traffic flow associated with a micro communication flow. Back-classifier 520 while monitoring the communication traffic flow from meter 511 may send a request to a network element upstream from the network element 500 to change priority level of the micro communication flow. This may be performed in substitute of local adjustment to priority level adjustment performed by marker 512, and shaper and dropper 513. The request may be communicated via upstream connection 522. Similarly, network element 500 may receive such request from network element in relation to downstream communication flow via a connection 521.

The Back-classifier 520 may be a new block in a network element operating according to the DiffServ (DS) architecture. A 'stream' may be an aggregate of all micro flows that are associated with a specific DiffServ value.

The capacity and range of DiffServ values limitations of each network element may be taken into consideration when determining congestion condition of a micro communication flow. The queue capacity of a per-hop-behavior (PHB) associated with a specific DiffServ value and the allowed range of DiffServ priorities to which a micro flow can be assigned may also be taken into consideration. The DiffServ domain may be characterized by a set of non-overlapping DiffServ value ranges, referred to as classes of service to which micro flows can be assigned. Each network element acting as a router has access to a resident table of the DiffServ classes of service. This table is usually the same across all the routers of the DiffServ domain. A micro flow can be assigned to a range of DiffServ values. Each micro flow starts at session initiation with the lowest allowed DiffServ value of its quality of service (QoS.) A stream's or stream subset DiffServ value can be changed dynamically in-session by the network to meet the QoS objectives or remain within the value range. A subset of micro flows of a communication flow can be reassigned to another DiffServ value provided the new value is within the allowed range, and the associated PHB queue has enough capacity to accommodate the subset. A subset may consist of a randomly selected number of micro flows such that the reallocation of these micro flows to another PHB will cause the source and target PHBs and associated queues to exhibit an in-profile traffic behavior.

An 'increase' of a micro communication flow priority defined by, for example, the DiffServ priority, is usually done to the next higher priority. An increase of priority could result in the stream being routed through a different path. A 'decrease' of DiffServ priority is usually done to the next lower priority. A decrease of a stream's priority could result in the stream being routed through a different path. As the network is rapidly changing states, backward propagation of requests to decrease a DiffServ priority may be met by an upstream network element, and the reassigned micro communication flow may then meet the QoS objective at the network element where the congestion was originally detected, or at least when the communication flow reaches it. For example, an initially over-subscribed PHB queue in the problem network element may be freed up by the time the lower-priority traffic originating from the upstream network element reaches the problem network element. In case no upstream network element can meet the request to lower the DiffServ priority, the request may be back propagated all the way to the source application. The source application may then reduces the class of service or drop the session.

The class of service of each data packet flowing through a network element is determined by comparing the DS value of the packet with the set of DS value ranges that specify the service classes. The set of DS values may be accessed by the network element in a local table. Alternative mechanisms for accessing class of service information may be remote table access on a net server or multicasting to the sources to send back this information.

A signaling protocol, such as signaling 450-53, may be added between network elements for back propagating traffic flow adjustments requests. The request to adjust the traffic includes information such as the selected micro flows that make up the communication flow, the current DS value, and the target DS value. The DiffServ domain may specify a new definition of distinct class of services, where each class of service consists of a DiffServ value range not overlapping over any other range. Each network element may have a local table of the DiffServ classes of service.

Each micro flow may be assigned at session initiation time to a distinct class of service. For example, the ranges 1–3 and 4–6, specify two separate QoS classes. A micro flow assigned to the first class may start with the DiffServ value 3. A network element on the path of a micro flow may reassign the DiffServ of the micro flow only to the value 1 or 2 that may depend on the capacity and range limitations of a PHB behavior associated with a specific DiffServ value.

The determination of the capacity and range may be done by the Back-classifier. The 'capacity check' is done by metering of the PHBs via the signaling link to the Shaper/Dropper and assessing whether the PHB queues can support an additional load. The 'range limitations check' may be performed by comparing the current DiffServ value to the class of service to which the current DiffServ value belongs. For example, the DS value 3 is part of the range 1–3, and therefore the micro flows of this stream can be reassigned only to DS values 1 or 2. Each network elements in the DS domain may have access to a local table listing the classes of service in the DS range.

Referring to FIG. 4, a number of network elements may be assigned to a specific DiffServ value to form DiffServ domains such as DiffServ domains 480-84. Each domain conditions the traffic entering their domain according to its DiffServ value. If network element 422 detects traffic that is out-of-profile, and there are no local traffic adjustments that can be made, it will propagate back to network elements 421 and 412 a request to reclassify the traffic reaching network element 422. This may include decrease the DS priority of a subset of the stream destined to network element 422. For example, if the stream's DS range of values is {3,4,5}, where '5' is the lowest priority, and the stream's current priority is '3', then network element 422 will propagate back a request to network elements 421 and 422 to decrease the priority of selected micro flows from priority '3' to '4'. In case the change can be performed by network element 421, and not by network element 412, the network element 412 may propagate back this request to network element 411 that may accommodate this request. If network element 422 detects in-profile micro communication flow, then the traffic QoS problem is effectively resolved. If not, then network element 422 propagates back a new request to decrease the priority from '4' to '5'. Network element 412 may route the lower priority traffic through a network element 413 to alleviate network element 422 congestion at a micro communication flow, if an intermediate network cannot reduce the DS priority.

What is claimed is:

1. In a communication network that includes a plurality of network elements connecting a plurality of source users to a plurality of terminal users via a plurality of communication traffic flows through said plurality of network elements, wherein each of said plurality of network elements has an internal traffic conditioning control, a method comprising the steps of:
   collecting performance data associated with each network element;
   passing said performance data associated with each network element to a network management element;
   creating a global traffic conditioning control based on said performance data associated with each network element;
   communicating said global traffic conditioning control to at least one of said plurality of network elements;
   re-shaping said internal control of at least one of said plurality of network elements based on said global traffic conditioning control.

2. The method as recited in claim 1 wherein said re-shaping includes at least one of changing a DS field of a data packet from a first value to a second value to control quality of service associated with the communication of said packet of data, remarking said data packet to be considered for dropping, and changing DiffServ probability model of at least one of the network elements.

3. The method as recited in claim 2 wherein said first value is assigned by one of said plurality of source users.

4. The method as recited in claim 3 wherein said second value is a value selected from a plurality of values that are pre-defined to be acceptable for quality of services associated with communication of said packet of data.

5. The method as recited in claim 1 wherein said collecting performance data associated with each network element includes performing a statistical analyses of performance data to create a summarized performance data and passing said summarized performance data in substitute of said performance data.

6. The method as recited in claim 1 wherein said creating said global traffic conditioning control includes correlating communication service records across a number of said network elements.

7. The method as recited in claim 1 wherein said creating said global traffic conditioning control includes correlating communication service records of a plurality of network flows.

8. The method as recited in claim 1 wherein said re-shaping includes changing DiffServ values of at least one of said plurality of communication traffic flows.

9. In a communication network that includes a plurality of network elements connecting a plurality of source users to a plurality of terminal users via a plurality of communication traffic flows through said plurality of network elements, wherein each of said plurality of network elements has an internal traffic conditioning control, a method comprising the steps of:
   means for collecting performance data associated with each network element;
   means for passing said performance data associated with each network element to a network management element;
   means for creating a global traffic conditioning control based on said performance data associated with each network element;
   means for communicating said global traffic conditioning control to at least one of said plurality of network elements;
   means for re-shaping said internal control of at least one of said plurality of network elements based on said global traffic conditioning control.

10. In a communication network that includes a plurality of network elements connecting a plurality of source users to a plurality of terminal users via a plurality of communication traffic flows, wherein each of said plurality of communication traffic flows includes a plurality of micro communication flows, through said plurality of network elements, a method comprising the steps of:
   detecting congestion of a micro communication flow associated with at least one of said plurality of communication traffic flows at a first network element of said plurality of network elements;
   detecting, at said first network element, a communication traffic flow priority at a first level associated with said congested micro communication flow;
   changing, at a second network element, said first communication traffic flow priority from said first level to a second level, wherein said second network element is in an upstream communication flow in relation with said first network element.

11. The method as recited in claim 10 further comprising the step of communicating from said first network element to said second network element a request to perform said changing step.

12. The method as recited in claim 10 wherein said second priority level of said congested micro communication flow is selected from a range of pre-defined acceptable priority levels.

13. The method as recited in claim 10 wherein said second priority level of said congested micro communication flow is of a lower priority level than said first level.

14. The method as recited in claim 10 wherein said second priority level of said congested micro communication flow is of a higher priority level than said first level.

15. The method as recited in claim 10 further comprising the steps of:

changing, at a third network element, said first communication traffic flow priority from said first level to said second level, wherein said third network element is in an upstream communication flow in relation with said second network element, and when said second network element fails to change said first communication traffic flow priority from said first level to said second level.

16. The method as recited in claim 10 wherein said detecting congestion of said micro communication flow is by way of detecting whether said micro communication flow is out of a predefined communication flow profile.

17. The method as recited in claim 10 wherein said second priority value is selected from a table stored at said second network element, and wherein the values stored in said table are defined to be associated with at least one class of service.

18. The method as recited in claim 17 wherein said least class of service is at least one of data, voice and video services.

19. The method as recited in claim 10 wherein said changing includes changing communication priority level of a number of micro communication flows having at least a common priority level at said first network element.

20. In a communication network that includes a plurality of network elements connecting a plurality of source users to a plurality of terminal users via a plurality of communication traffic flows, wherein each of said plurality of communication traffic flows includes a plurality of micro communication flows, through said plurality of network elements, an apparatus comprising of:

means for detecting congestion of a micro communication flow associated with at least one of said plurality of communication traffic flows at a first network element of said plurality of network elements;

means for detecting, at said first network element, a communication traffic flow priority at a first level associated with said congested micro communication flow;

means for changing, at a second network element, said first communication traffic flow priority from said first level to a second level, wherein said second network element is in an upstream communication flow in relation with said first network element.

21. The apparatus as recited in claim 20 further comprising means for communicating from said first network element to said second network element a request for said means for changing.

* * * * *